(12) United States Patent
Murase et al.

(10) Patent No.: US 7,134,382 B2
(45) Date of Patent: Nov. 14, 2006

(54) PAINT COMPOSITION AND SLIDING PART

(75) Inventors: Hitotoshi Murase, Kariya (JP); Toshihisa Shimo, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/828,016

(22) Filed: Apr. 20, 2004

(65) Prior Publication Data
US 2004/0221715 A1    Nov. 11, 2004

(30) Foreign Application Priority Data
Apr. 22, 2003   (JP)   ............................ 2003-117475

(51) Int. Cl.
*F01B 31/10* (2006.01)
(52) U.S. Cl. ............................................. 92/155; 92/71
(58) Field of Classification Search .................. 92/155, 92/71
See application file for complete search history.

(56) References Cited

U.S. PATENT DOCUMENTS

| | | | | |
|---|---|---|---|---|
| 4,641,570 A | * | 2/1987 | Futamura et al. ............... | 92/71 |
| 4,683,804 A | * | 8/1987 | Futamura et al. ............... | 92/71 |
| 5,422,061 A | * | 6/1995 | Takahashi et al. ........... | 264/571 |
| 5,502,097 A | * | 3/1996 | Saito ........................... | 524/389 |
| 5,556,261 A | * | 9/1996 | Kimura et al. .................. | 92/71 |
| 6,228,932 B1 | * | 5/2001 | Saito .......................... | 524/502 |
| 6,232,386 B1 | * | 5/2001 | Vargo et al. ................. | 524/434 |
| 6,329,042 B1 | * | 12/2001 | Yamada et al. .......... | 428/195.1 |
| 6,357,340 B1 | * | 3/2002 | Kato et al. ..................... | 92/155 |
| 6,378,415 B1 | * | 4/2002 | Sugiura et al. ............... | 92/155 |
| 6,884,827 B1 | * | 4/2005 | Ota et al. .................... | 522/156 |
| 6,905,246 B1 | * | 6/2005 | Iwata et al. .................... | 92/71 |

FOREIGN PATENT DOCUMENTS

| | | |
|---|---|---|
| JP | 54-162014 | 12/1979 |
| JP | 59-108850 | 6/1984 |
| JP | 62-185748 | 8/1987 |
| JP | 10-122040 | 5/1998 |
| JP | 2000-249063 | 9/2000 |
| JP | 2001-011372 | 1/2001 |

* cited by examiner

*Primary Examiner*—Edward K. Look
*Assistant Examiner*—Michael Leslie
(74) *Attorney, Agent, or Firm*—Morgan & Finnegan, LLP (57) ABSTRACT

A paint composition including a surface-modified fluoro-resin powder and a dispersion medium for dispersing the fluoro-resin powder, with the dispersion medium containing a heat-resistant resin and a solvent for dissolving the heat-resistant resin. The paint composition is useful for painting a sliding part, such as parts of a compressor. In particular, the paint composition is useful for forming a resin layer on sliding surfaces that contains the surface-modified fluoro-resin powder and heat-resistant resin for enhancing sliding properties of these surfaces.

16 Claims, 4 Drawing Sheets

PAINT COMPOSITION AND SLIDING PART

BACKGROUND OF THE INVENTION

The present invention relates to a paint composition and a sliding part.

Since fluoro-resins excel in heat resistance, sliding properties, and water and oil repellency, a resin layer containing fluoro-resin powder has conventionally been formed on the surface of a sliding part to improve the sliding properties. For example, Japanese Laid-Open Patent Publication No. 59-108850 proposes a piston for an engine whose outer surface of the skirt portion is baked-coated with a coating material prepared by dispersing flaked aluminum and fluoro-resin powder in a heat-resistant resin (epoxy resin). Japanese Laid-Open Patent Publication No. 10-122040 proposes a piston for an internal combustion engine wherein a coating layer composed of fluoro-resin, polyimide, and iron oxide powder is formed on the peripheral surface of the piston skirt. Japanese Laid-Open Patent Publication No. 2001-11372 proposes a paint composition composed of polytetrafluoroethylene (PTFE), polyamide imide, and alumina particles, wherein the weight ratio of PTFE to polyamide imide is 5 to 10 inclusive: 95 to 90 inclusive, and containing 5 to 10 parts by weight inclusive of alumina particles to 100 parts by weight of the total of PTFE and polyamide imide. A piston for an internal combustion engine that has the coating film of the paint composition on the peripheral surface of the piston skirt is also proposed. Japanese Laid-Open Patent Publication No. 2000-249063 proposes the formation of a coating layer containing fluoro-resin as the major component on the peripheral surface of the piston of a compressor used in the air-conditioning system of vehicles.

The lubricant oil in a compressor is atomized by compressing coolant gas, such as chlorofluorocarbon flowing when the compressor is operated, which is then delivered to the sliding parts composing the internal mechanisms of the compressor to lubricate the sliding parts. However, when a compressor kept without operation for a long period of time is restarted, the lubricant oil adhered on sliding portions may be flushed away by the coolant gas. For example, in the initial stage of the operation of a swash plate compressor, wherein a piston is connected to the swash plate via a shoe, and is reciprocated in a cylinder bore by the rotation or oscillation of the swash plate, the swash plate slides on the shoe before the lubricant oil reaches the sliding surfaces of the swash plate and the shoe. Moreover, before the lubricant oil reaches the sliding surfaces of the swash plate and the shoe, the coolant in the gaseous state reaches the sliding surfaces, and plays a role to flush away the lubricant oil remaining on the sliding surfaces. Therefore, in the initial stage of the operation, the swash plate slides on the shoe in a dry state without the lubricant oil. During the period after the compressor is started and before the coolant gas returns to the compressor to form an oil mist (the period is only about one minute), a sufficient quantity of oil is not present on the sliding portions that require lubrication despite the operation of the compressor. It is extremely important to secure lubrication on the sliding portions for such a period when the quantity of lubricant oil is insufficient.

In recent years, carbon dioxide has attracted people's attention as a coolant for compressors; however, when carbon dioxide is used as a coolant, the compressive load on a swash plate via a piston is significantly larger than the compressive load when a chlorofluorocarbon-based coolant is used. In order to secure high reliability for compressors even in such a strict sliding environment, the improvement of sliding properties of the sliding portions, through the improvement of seizure resistance, wear resistance, and adhesion to base materials of the sliding portions, has been demanded.

As described above, the improvement of sliding properties by forming a coating layer containing fluoro-resin powder on the surface of a sliding part is disclosed in the above-cited four patent publications. Although fluoro-resins excel in heat resistance, chemical resistance, weather resistance, sliding properties, water and oil repellency, and electrical properties, the integration of fluoro-resins with other materials is difficult because of the difficulty of adhesion. The members composed of a fluoro-resin also has poor adhesiveness to the adhesives used for cladding the member composed of a fluoro-resin with other members.

Among the above-cited four patent publications, Japanese Laid-Open Patent Publication No. 59-108850, Japanese Laid-Open Patent Publication No. 10-122040, and Japanese Laid-Open Patent Publication No. 2001-11372 disclose that the average particle diameter of the fluoro-resin powder is made within a predetermined range for improving the stability of dispersion in paint, and the flatness of formed coating films. However, none of these patent publications disclose the improvement of the sliding properties of resin layers containing fluoro-resin powder by improving the wettability and adhesiveness of the fluoro-resin particles.

SUMMARY OF THE INVENTION

Accordingly, it is an object of the present invention to provide a paint composition that can form a coating film having improved seizure resistance and wear resistance. It is another object of the present invention to provide a sliding part having improved seizure resistance and wear resistance.

To achieve the above objective, the present invention provides a paint composition. The paint composition includes a surface-modified fluoro-resin powder and a dispersion medium for dispersing the fluoro-resin powder. The dispersion medium contains a heat-resistant resin and a solvent for dissolving said heat-resistant resin.

The present invention provides another paint composition. The paint composition includes a surface-modified fluoro-resin powder and a dispersion medium for dispersing the fluoro-resin powder. The dispersion medium contains a thermosetting resin in an uncured state.

In another aspect of the present invention, a sliding part is provided. The sliding part includes a sliding surface formed of a resin layer containing a surface-modified fluoro-resin powder and a heat-resistant resin.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
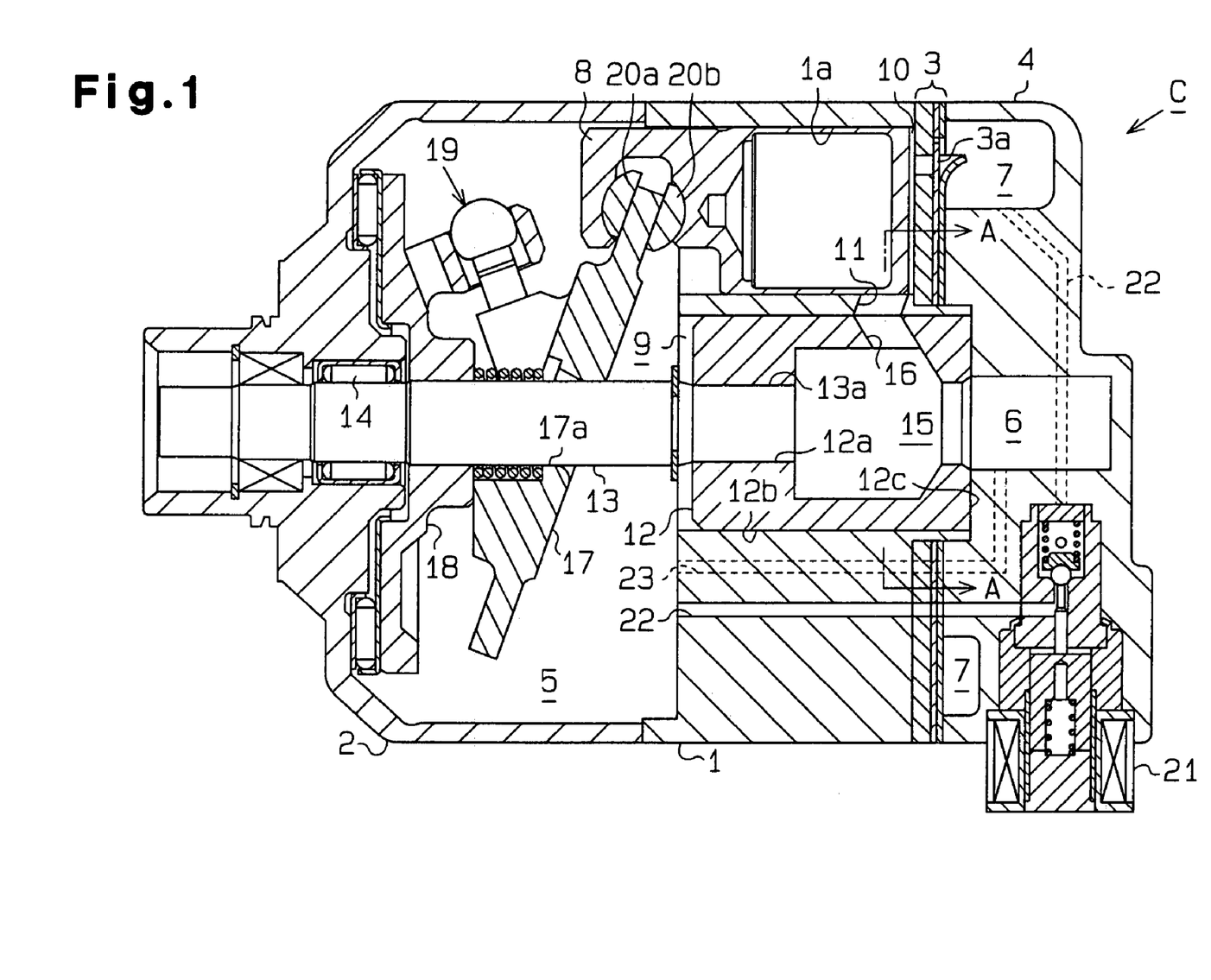
FIG. 1 is a sectional view of a compressor having a sliding part according to an embodiment of the present invention.

The present invention will be described below of a preferred embodiment for a swash-plate type variable displacement compressor as a piston-type compressor. In FIG. 1, the left-hand side of the drawing corresponds to the front of the compressor, and the right-hand side of the drawing corresponds to the back of the compressor As FIG. 1 shows, the swash-plate type variable displacement compressor C has a cylinder block 1, a front housing 2 joined to the front end of the cylinder block 1, and a rear housing 4 joined to the rear end of the cylinder block 1 via a valve plate assembly 3. The cylinder block 1, the front housing 2, the valve plate assembly 3, and the rear housing 4 are mutually fixed with a plurality of through bolts (not shown) to constitute the housing of the compressor C.

Figure 2:
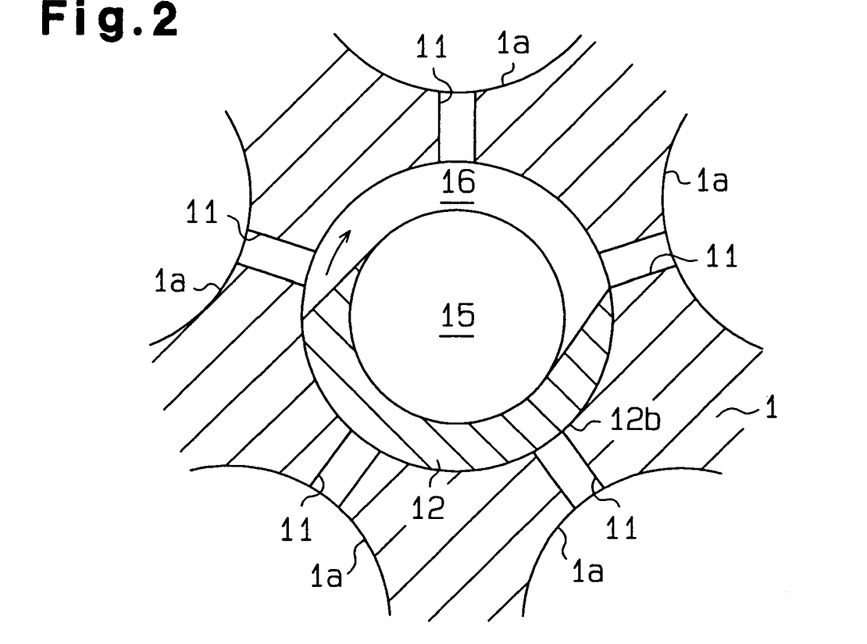
FIG. 2 is a sectional view along the line A—A of FIG. 1.

In the housing of the compressor C, a crank chamber 5, a suction chamber 6, and a discharge chamber 7 are partitioned. As FIGS. 1 and 2 show, a plurality of cylinder bores 1a (only one is shown in FIG. 1) are formed in the cylinder block 1. In each cylinder bore 1a, a single-headed piston 8 is reciprocatably accommodated. A compression chamber 10 whose volume is varied corresponding to the reciprocal motion of the piston 8 is partitioned in each cylinder bore 1a. The discharge chamber 7 can communicate with each cylinder bore 1a through a discharge valve 3a installed on the valve plate assembly 3.

In the housing of the compressor C, a valve-accommodating chamber 9 is formed for accommodating a rotary valve 12. The valve-accommodating chamber 9 extends from the central portion of the cylinder block 1 surrounded by the cylinder bores 1a to the central portion of the rear housing 4. The cross section of the valve-accommodating chamber 9 is circular, and the rear end of the valve-accommodating chamber 9 is connected to a suction chamber 6. The valve-accommodating chamber 9 communicates with the compression chambers 10 through suction routes 11 (refer to FIG. 2) formed in the cylinder block 1.

The rotary valve 12 is rotatably accommodated in the valve-accommodating chamber 9. The rotary valve 12 is formed of an aluminum-based metallic material, and is cylindrical. A mounting hole 12a passes through the center of the front bottom of the rotary valve 12.

A drive shaft 13 is disposed in the crank chamber 5, and is rotatably held relative to the housing of the compressor C by a bearing 14 and the rotary valve 12. The rear end of the drive shaft 13 is disposed in the valve-accommodating chamber 9. The reduced-diameter portion 13a in the rear end of the drive shaft 13 is press-fitted into a mounting hole 12a for the rotary valve 12, and thereby, the rotary valve 12 is integrated with the drive shaft 13. Therefore, the rotary valve 12 rotates synchronously with the rotation of the drive shaft 13, that is, the reciprocating movement of the piston 8.

The internal space of the rotary valve 12 constitutes an introduction chamber 15 connected to the suction chamber 6. As FIG. 2 shows, a suction guide 16 normally communicated with the introduction chamber 15 is formed in a certain section on the peripheral surface 12b of the rotary valve 12 in the peripheral direction. The suction guide 16 and the suction route 11 constitute a coolant gas route between the introduction chamber 15 and the compression chamber 10 as the suction pressure region. The rotary valve 12 releases or shuts the coolant gas route selectively according to the locations of the suction guide 16 relative to the suction route 11.

A lug plate 18 as a rotation base is rotatably fixed to the drive shaft 13 in the crank chamber 5. A swash plate 17 as a cam plate is accommodated in the crank chamber 5. An insertion hole 17a is formed in the central portion of the swash plate 17, and the drive shaft 13 is supported by the swash plate 17 by being inserted in the insertion hole 17a. The swash plate 17 is also connected to the lug plate 18 through a hinge mechanism 19. Therefore, the swash plate 17 can rotate together with the drive shaft 13, and can rotate in an inclined state accompanying sliding in the axial direction of the drive shaft 13.

The peripheral portion of the swash plate 17 is slidably moored to the end of each piston 8 by a front-and-back pair of shoes 20a and 20b. Therefore, the rotation of the swash plate 17 accompanying the rotation of the drive shaft 13 is converted to the reciprocal movement of the piston 8 through the shoes 20a and 20b. The stroke of the piston 8 is determined by the inclination angle of the swash plate 17.

A control valve 21 well known in the art for controlling the pressure Pc in the crank chamber 5 is installed in the rear housing 4. The control valve 21 is installed in the middle of an air-supply path 22 that connects the crank chamber 5 to the discharge chamber 7, and is equipped with a valve mechanism that controls the opening of the air-supply path 22 using the electromagnetic force of the solenoid. The pressure Pc in the crank chamber 5 is determined by the balance between the quantity of the coolant gas introduced from the discharge chamber 7 into the crank chamber 5 through the control valve 21 and the quantity of the coolant gas discharged out of the crank chamber 5 to the suction chamber 6 through an air-extraction path 23 that communicates the crank chamber 5 with the suction chamber 6.

Figure 3:
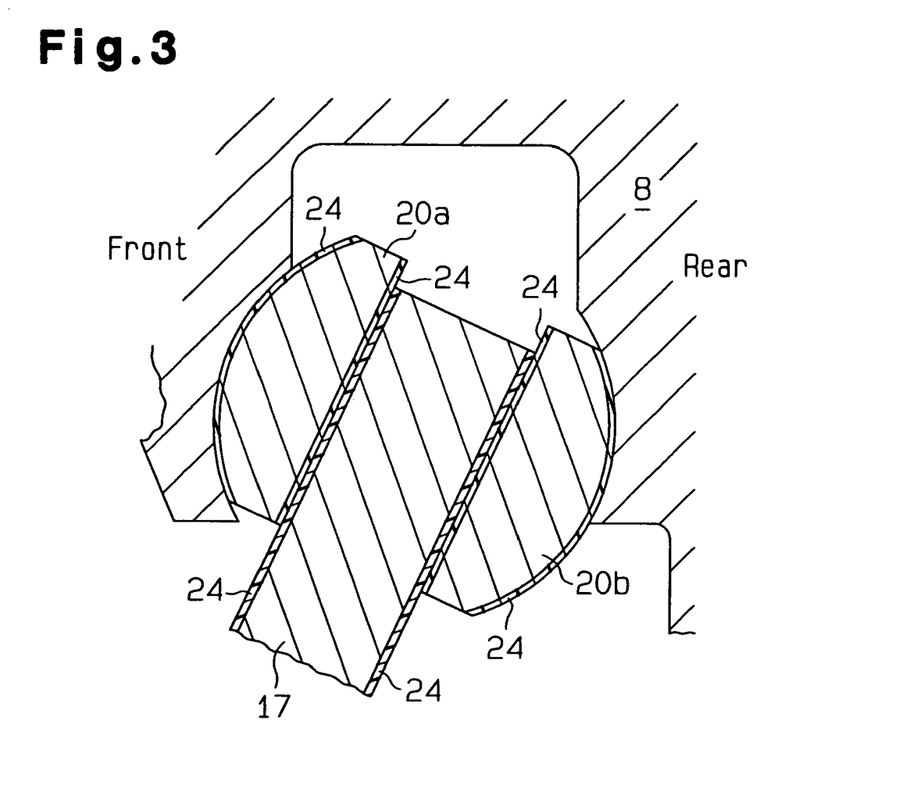
FIG. 3 is a sectional view showing a connection unit for connecting the piston and the shoe in the compressor of FIG. 1.

The swash plate 17 and the shoes 20a and 20b are sliding parts in the compressor C, and as FIG. 3 shows, at least the sliding surfaces thereof are formed of films 24 as resin layers. The rotary valve 12 is also a sliding part in the compressor C, and the peripheral surface 12b and rear-end surface 12c, which are the sliding surfaces of the rotary valve 12, are also formed of films 24.

The films 24 are directly formed on the surfaces of the swash plate 17, the shoes 20a and 20b, and the rotary valve 12. The films 24 contain surface-modified fluoro-resin powder and a heat-resistant resin. The films 24 are formed by applying a paint composition onto the surfaces of the swash plate 17, the shoes 20a and 20b, and the rotary valve 12, and by baking and curing the applied paint composition. The paint composition is composed of surface-modified fluoro-resin powder and a dispersing medium for dispersing the fluoro-resin powder. In this embodiment, the dispersing medium contains a heat-resistant resin and a solvent for dissolving the heat-resistant resin. The heat-resistant resin may be a thermosetting resin or a thermoplastic resin. The thickness of the films 24 may be from 5 to 50 µm, preferably from 10 to 30 µm.

Next, the operation of the compressor C will be described.

When the drive shaft 13 is rotated, the swash plate 17 is rotated integrally with the drive shaft 13. The rotation of the swash plate 17 is converted to the reciprocal movement of the piston 8 through the shoes 20a and 20b. By the reciprocal movement of the piston 8, the suction of the coolant gas from the suction chamber 6, the compression of the sucked coolant gas, and the discharge of the compressed coolant gat into the discharge chamber 7 are sequentially repeated in the cylinder bore 1a. The coolant supplied from an external coolant circuit (not shown) into the suction chamber 6 is sucked into the cylinder bore 1a through the introduction chamber 15, the suction guide 16, and the suction route 11; undergoes compression by the movement of the piston 8; and then discharged into the discharge chamber 7 through the discharge port. The coolant discharged into the discharge chamber 7 is discharged out of the discharge hole to the external coolant circuit.

The opening of the control valve 21 is adjusted corresponding to the cooling load, and thereby, the connection state of the discharge chamber 7 to the crank chamber 5 is varied. In the state wherein the cooling load is high and the pressure in the suction chamber 6 is also high, the opening of the control valve 21 decreases, the pressure in the crank chamber 5 (pressure Pc) decreases, and the inclination angle of the swash plate 17 increases. As a result, the stroke of the piston 8 increases, and the compressor C is operated at a large displacement. On the other hand, in a state wherein the cooling load is low and the pressure in the suction chamber 6 is also low, the opening of the control valve 21 increases, the pressure Pc in the crank chamber 5 rises, and the inclination angle of the swash plate 17 decreases. As a result, the stroke of the piston 8 decreases, and the compressor C is operated at a small displacement. The inclination angle means the angle of the plane orthogonal to the axial line of the drive shaft 13 to the swash plate 17.

The films 24 formed on the sliding surfaces of the swash plate 17 and shoes 20a and 20b, on the peripheral surface 12b and the rear-end surface 12c, which are the sliding surfaces of the rotary valve 12, contain surface-modified fluoro-resin powder. Therefore, the wettability and adhesiveness of the surfaces of the films 24 are improved in comparison to the case wherein the films contain unmodified fluoro-resin powder.

Fluoro-resin powder is added to lower the coefficient of friction and to improve the sliding properties in the absence of lubricant oil. Although increase in the proportion of the fluoro-resin powder can be considered to further improve the sliding properties, a simple increase in the proportion of the fluoro-resin powder results in an increase of wear of the films 24 because of a weak bonding force between the fluoro-resin powder and the heat-resistant resin. However, the surface-modified fluoro-resin powder has increased adhesiveness due to an anchoring effect, and improved wettability of the surfaces. Thereby, the coating film produced by the paint composition that contains the surface-modified fluoro-resin powder has high seizure resistance and wear resistance. Therefore, in the compressor C, the sliding properties and durability of the sliding surfaces are improved, and furthermore, the reliability and the durability of the compressor C are improved.

<Method for Modifying the Surfaces of Fluoro-Resin Powder>

Figure 4:
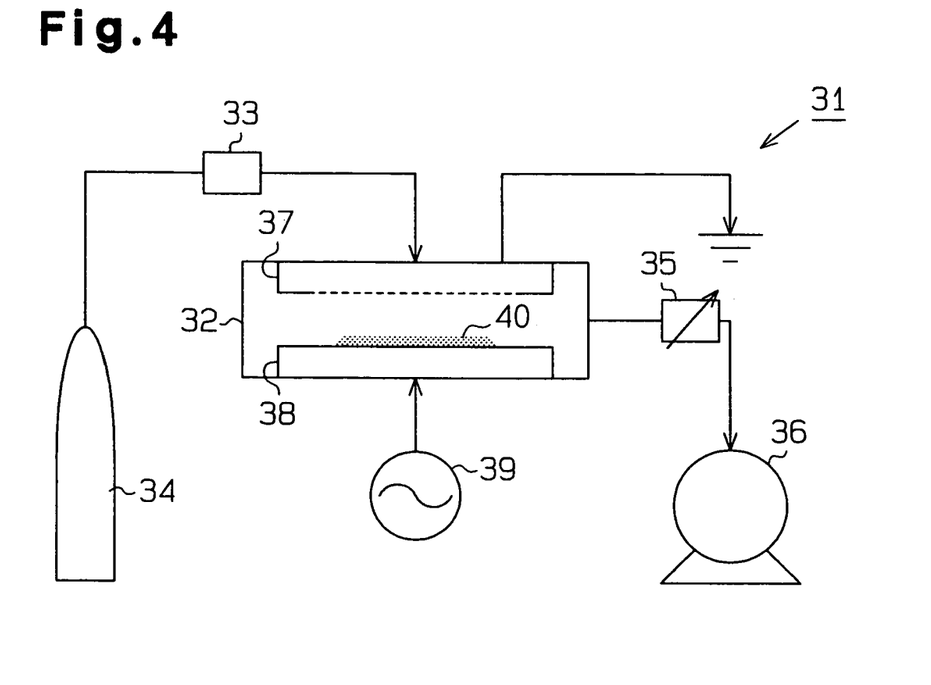
FIG. 4 is a schematic diagram showing plasma treatment equipment.

The method for modifying the surfaces of fluoro-resin powder may be a plasma treatment method using plasma-treatment equipment, for example, as shown in FIG. 4.

As FIG. 4 shows, plasma-treatment equipment 31 comprises a chamber 32, a treating-gas cylinder 34 connected to the chamber 32 through a mass flow controller 33, and a vacuum pump 36 connected to the chamber 32 through a conductance valve 35. In the chamber 32, an upper electrode 37 and a lower electrode 38 are installed. The upper electrode 37 and the lower electrode 38 are disposed so as to face each other. The lower electrode 38 is formed to be flat, and the sample to be subjected to plasma treatment can be placed thereon. The upper electrode 37 is grounded, and the lower electrode 38 is connected to a radio-frequency oscillator 39.

Commercially available fluoro-resin powder can be subjected to plasma treatment. Although the average primary particle diameter of the fluoro-resin powder to be used is not specifically limited, it is preferably from 0.01 to 20 µm, and more preferably 5 µm or less.

For plasma treatment, for example, a mixed gas combination of argon (Ar) and hydrogen ($H_2$) is used as the atmospheric gas. The mixing ratio of argon and hydrogen is not specifically limited. However, if the quantity of hydrogen in the mixed gas is less than 5% by volume, a long time is required for plasma treatment; therefore, the quantity of hydrogen in the mixed gas is preferably no less than 5% by volume. Also, if the quantity of hydrogen in the mixed gas exceeds 20% by volume, explosion-proof measures are required; therefore, the quantity of hydrogen in the mixed gas is preferably no more than 20% by volume.

The plasma treatment is performed by the following procedures:

First, the cover (not shown) of the chamber 32 is opened, and a fluoro-resin powder 40 is placed on the lower electrode 38. At this time, if the fluoro-resin powder 40 is thickly mounded, the entire fluoro-resin powder 40 cannot be subjected to plasma treatment; therefore, it is preferable to mound the fluoro-resin powder 40 to an even thickness of 2 to 3 mm on the lower electrode 38.

Next, the cover of the chamber 32 is closed, and the pressure in the chamber 32 is reduced using the vacuum pump 36. The chamber 32 is slowly evacuated until the pressure is reduced to some extent so as to prevent the fluoro-resin powder 40 from soaring. When the pressure in the chamber 32 is lowered to a predetermined value, a treatment gas is introduced into the chamber 32 at a constant flow rate using the mass flow controller 33 while continuing evacuation by the vacuum pump 36.

Then, the conductance valve 35 disposed between the chamber 32 and the vacuum pump 36 is controlled to make the vacuum (pressure reduction) in the chamber 32 meet the treatment conditions. Thereafter, when the radio-frequency oscillator 39 is operated to impress a radio frequency on the lower electrode 38, the reaction gas in the chamber 32 is turned into a plasma. The surface of the fluoro-resin powder 40 is modified by the reaction with the reaction gas turned into a plasma.

After a predetermined time has passed, the introduction of the treatment gas, the impression of the radio frequency, and evacuation are stopped. Thereafter the pressure in the chamber 32 is slowly returned to atmospheric pressure so as to prevent the fluoro-resin powder 40 from soaring, the cover is opened and the fluoro-resin powder 40 is taken out.

Figure 6A:
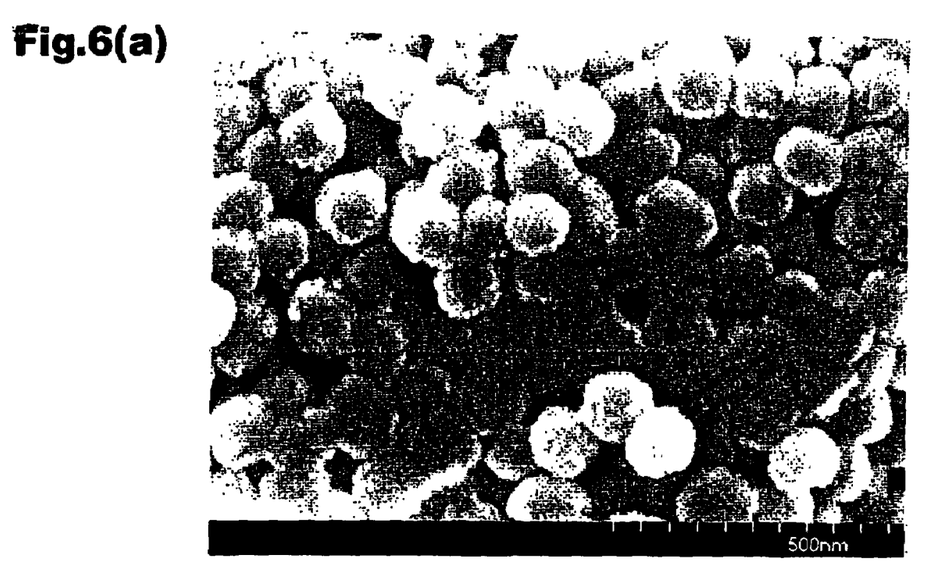
FIG. 6(a) is a scanning electron micrograph of fluoro-resin powder before plasma treatment at a magnification of 100,000×.
Figure 6B:
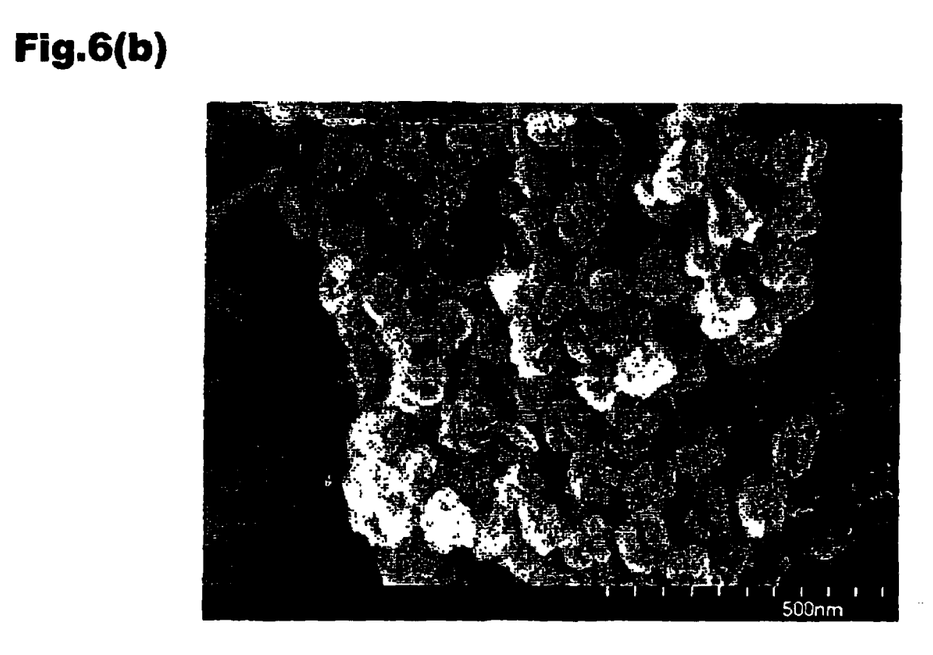
FIG. 6(b) is a scanning electron micrograph of fluoro-resin powder after plasma treatment at a magnification of 100,000×.

FIG. 6(b) is a scanning electron micrograph of commercially available PTFE powder after plasma treatment according to the above-described procedures. As is obvious from the comparison with the scanning electron micrograph of the PTFE powder before plasma treatment shown in FIG. 6(a), the PTFE powder after plasma treatment as shown in FIG. 6(b) has a different shape from the shape of the PTFE powder before plasma treatment. Specifically, the PTFE powder before plasma treatment is substantially spherical; whereas, the PTFE powder after plasma treatment has an irregularly shaped surface, and is not spherical.

The detailed conditions for the plasma treatment of PTFE powder is as follows:
Upper electrode: Made of hard aluminum; Dimensions: 550×650 mm
Lower electrode: Made of hard aluminum; Dimensions: 550×650 mm
Distance between electrodes: 80 mm
Radio-frequency power source: 13.56 MHz
Impressed power: 1,000 W
Ambient pressure: 20 Pa
Gas quantity: 300 ml/min
Treating time: 15 minutes The surface modification of fluoro-resin powder may be performed using a method other than the above-described plasma treatment method, for example, a metallic sodium complex method. The surface modification using a metallic sodium complex method is performed in the following procedures (i) to (v):
i. Fluoro-resin powder is placed in a vessel containing acetone, and stirred using a PTFE stirrer to clean the fluoro-resin powder.
ii. The fluoro-resin powder is taken out of the vessel, and dried in a drying furnace.
iii. The fluoro-resin powder is immersed and stirred in "Tetra Etch KEEA", a product of Junkosha Inc., which is a glycol-based solvent solution containing sodium-naphthalene complex. Although the immersion time depends on the particle diameter of the fluoro-resin powder, it is preferably five seconds or longer.
iv. The fluoro-resin powder is taken out, and washed with isopropyl alcohol.
v. The fluoro-resin powder is further washed with water and acetone in this order, and then dried in a drying furnace.

<Preparation of Paint Composition and Formation of Films on Sliding Part>

Surface-modified fluoro-resin powder (e.g., surface-modified PTFE powder) is mixed with a dispersing medium (e.g., polyamide imide varnish) to prepare a paint composition. The paint composition is applied to the degreased surface of a sliding part, and the applied paint composition is baked, for example, at 200° C. for 60 minutes to form a coating film.

The present invention will be described below in further detail referring to examples and comparative examples.

EXAMPLE 1

PTFE powder surface-modified using plasma treatment, having an average primary particle diameter of 0.1 μm was compounded with polyamide imide varnish, stirred well, and mixed using a three-roll mill to prepare a paint composition containing 60% by weight of polyamide imide and 40% by weight of PTFE. The paint composition was applied to a degreased plate (base material) of an aluminum alloy "A 390" using an air sprayer, and baked at 200° C. for 60 minutes. Thereby, a sample having a resin layer of a thickness of 25 μm on the plate was obtained.

EXAMPLE 2

A sample having a resin layer of a thickness of 25 μm on the plate was obtained in the same manner as in Example 1, except that PTFE powder surface-modified using plasma treatment, having an average primary particle diameter of 0.1 μm was substituted by PTFE powder surface-modified using the metallic sodium complex method, having an average primary particle diameter of 0.1 μm.

EXAMPLE 3

A sample having a resin layer of a thickness of 25 μm on the plate was obtained in the same manner as in Example 1, except that PTFE powder surface-modified using plasma treatment, having an average primary particle diameter of 0.1 μm was substituted by PTFE powder surface-modified using plasma treatment, having an average primary particle diameter of 1 μm.

EXAMPLE 4

A sample having a resin layer of a thickness of 25 μm on the plate was obtained in the same manner as in Example 1, except that PTFE powder surface-modified using plasma treatment, having an average primary particle diameter of 0.1 μm was substituted by PTFE powder surface-modified using plasma treatment, having an average primary particle diameter of 5 μm.

COMPARATIVE EXAMPLE 1

A sample having a resin layer of a thickness of 25 μm on the plate was obtained in the same manner as in Example 1, except that PTFE powder surface-modified using plasma treatment, having an average primary particle diameter of 0.1 μm was substituted by PTFE powder the surface of which was not modified, having an average primary particle diameter of 0.1 μm.

COMPARATIVE EXAMPLE 2

A sample having a resin layer of a thickness of 25 μm on the plate was obtained in the same manner as in Example 1, except that PTFE powder surface-modified using plasma treatment, having an average primary particle diameter of 0.1 μm was substituted by PTFE powder the surface of which was not modified, having an average primary particle diameter of 1 μm.

COMPARATIVE EXAMPLE 3

A sample having a resin layer of a thickness of 25 μm on the plate was obtained in the same manner as in Example 1, except that PTFE powder surface-modified using plasma treatment, having an average primary particle diameter of 0.1 μm was substituted by PTFE powder the surface of which was not modified, having an average primary particle diameter of 5 μm.

EXAMPLE 5

PTFE powder surface-modified using plasma treatment, having an average primary particle diameter of 0.1 μm and molybdenum disulfide were compounded with polyamide imide varnish, stirred well, and mixed using a three-roll mill to prepare a paint composition containing 60% by weight of polyamide imide, 20% by weight of PTFE, and 20% by weight of molybdenum disulfide. The paint composition was applied to a degreased plate (base material) of an aluminum alloy "A 390" using an air sprayer, and baked at 200° C. for 60 minutes. Thereby, a sample having a resin layer of a thickness of 25 µm on the plate was obtained.

EXAMPLE 6

A sample having a resin layer of a thickness of 25 µm on the plate was obtained in the same manner as in Example 5, except that PTFE powder surface-modified using plasma treatment, having an average primary particle diameter of 0.1 µm was substituted by PTFE powder surface-modified using the metallic sodium complex method, having an average primary particle diameter of 0.1 µm.

COMPARATIVE EXAMPLE 4

A sample having a resin layer of a thickness of 25 µm on the plate was obtained in the same manner as in Example 5, except that PTFE powder surface-modified using plasma treatment, having an average primary particle diameter of 0.1 µm was substituted by PTFE powder the surface of which was not modified, having an average primary particle diameter of 0.1 µm.

Figures 5A, 5B:
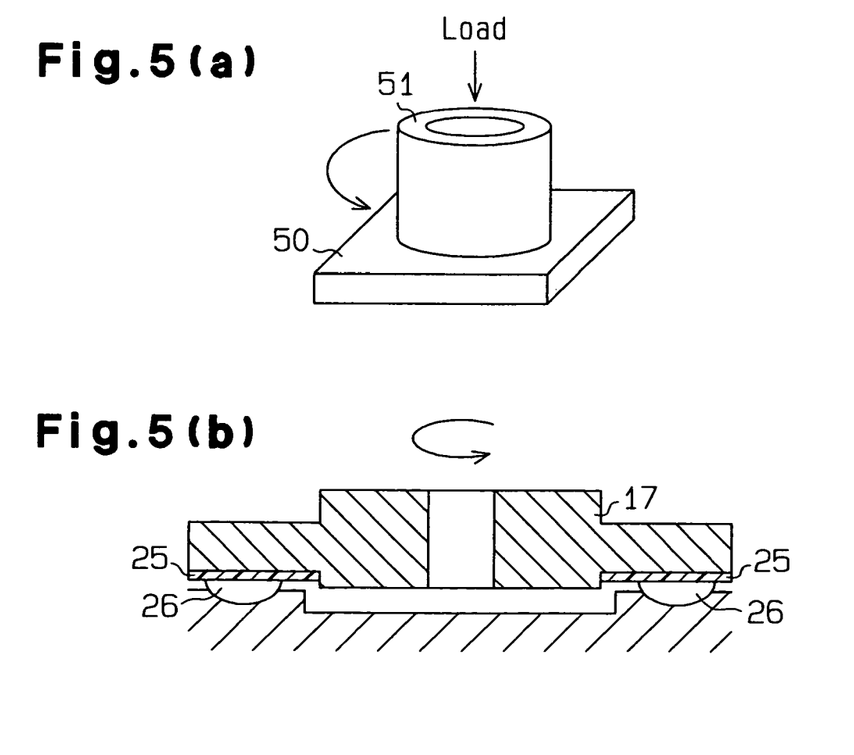
FIG. 5(a) is a perspective view illustrating a method for a test using a thrust tester for evaluating the seizure resistance of samples in Examples and Comparative Examples.
FIG. 5(b) is a schematic sectional view illustrating a method for a test for evaluating the seizure resistance of swash plates in Examples and Comparative Examples.

The samples prepared in the above Examples 1 to 6 and Comparative Examples 1 to 4 were subjected to the following tests using a thrust tester. As FIG. 5(a) shows, a ring-shaped counter piece 51 composed of bearing steel "SUJ 2" was thrust against the resin layer of each sample 50 in the absence of lubricant oil at a load of 10 MPa, and the counter piece 51 was rotated at a speed of 3.6 m/s. The counter piece 51 was rotated until seizure between the sample 50 and the counter piece 51 occurred, and the time until seizure occurred was measured. The results are shown in Table 1.

TABLE 1

|  | Surface modifying method | Average primary particle diameter of fluoro-resin powder | Presence of $MoS_2$ | Time until seizure occurs |
| --- | --- | --- | --- | --- |
| Ex. 1 | Plasma treatment method | 0.1 µm | No | 228 sec |
| Ex. 2 | Metallic sodium complex method | 0.1 µm | No | 239 sec |
| Ex. 3 | Plasma treatment method | 1 µm | No | 231 sec |
| Ex. 4 | Plasma treatment method | 5 µm | No | 196 sec |
| C. Ex. 1 | — | 0.1 µm | No | 187 sec |
| C. Ex. 2 | — | 1 µm | No | 181 sec |
| C. Ex. 3 | — | 5 µm | No | 134 sec |
| Ex. 5 | Plasma treatment method | 0.1 µm | Yes | 199 sec |
| Ex. 6 | Metallic sodium complex method | 0.1 µm | Yes | 212 sec |
| C. Ex. 4 | — | 0.1 µm | Yes | 55 sec |

As Table 1 shows, the samples prepared in any of Examples 1 to 4 using surface-modified fluoro-resin powder required a longer time until seizure occurred than the samples prepared in Comparative Examples 1 to 3 using fluoro-resin powder the surfaces of which were not modified. These results suggest that the surface modification of fluoro-resin powder improves lubricant properties. The samples prepared in Examples 5 and 6 using molybdenum disulfide as a solid lubricant other than fluoro-resin powder together with surface-modified fluoro-resin powder also required a longer time until seizure occurred than the samples prepared in Comparative Example 4 using fluoro-resin powder the surfaces of which were not modified together with molybdenum disulfide. However, the samples prepared in Examples 5 and 6 required a shorter time until seizure occurred than the samples prepared in Examples 1 and 2. Furthermore, from the comparison of Example 1 to Example 2, and the comparison of Example 5 to Example 6, it is known that fluoro-resin powder surface-modified using the metallic sodium complex method required a longer time until seizure occurred than the fluoro-resin powder surface-modified using the plasma treatment method.

EXAMPLE 7

PTFE powder surface-modified using plasma treatment, having an average primary particle diameter of 0.1 µm was compounded with polyamide imide varnish, stirred well, and mixed using a three-roll mill to prepare a paint composition containing 60% by weight of polyamide imide and 40% by weight of PTFE. The paint composition was applied to a tin-plating layer formed on a swash plate 17 (refer to FIG. 5(b)) composed of an aluminum alloy "A 390" using a bar coater, and baked at 200° C. for 60 minutes. Thereby, the swash plate 17 having a resin layer 25 of a thickness of 15 µm on the surface was obtained.

COMPARATIVE EXAMPLE 5

A swash plate 17 having a resin layer of a thickness of 15 µm on the surface was obtained in the same manner as in Example 7, except that PTFE powder surface-modified using plasma treatment, having an average primary particle diameter of 0.1 µm was substituted by PTFE powder the surface of which was not modified, having an average primary particle diameter of 0.1 µm.

As FIG. 5(b) shows, the resin layer 25 of each of swash plates 17 prepared in Example 7 and Comparative Example 5 was thrust against the shoe 26 composed of bearing steel in the absence of lubricant oil at a load of 2000 N, and the swash plate 17 was rotated at a speed of 10 m/s. The swash plate 17 was rotated until seizure between the swash plate 17 and the shoe 26 occurred, and the time until seizure occurred was measured. The results are shown in Table 2.

TABLE 2

|  | Time until seizure occurs |
| --- | --- |
| Ex. 7 | 437 sec |
| C. Ex. 5 | 320 sec |

As Table 2 shows, the swash plate 17 prepared in Example 7 required a longer time until seizure occurred than the swash plate 17 prepared in Comparative Example 5. This result suggests that the surface modification of fluoro-resin powder improves lubricant properties.

EXAMPLE 8

PTFE powder surface-modified using the metallic sodium complex method, having an average primary particle diameter of 0.1 µm and molybdenum disulfide were compounded with polyamide imide varnish, stirred well, and mixed using a three-roll mill to prepare a paint composition containing 60% by weight of polyamide imide, 20% by weight of PTFE, and 20% by weight of molybdenum disulfide. The paint composition was applied to a degreased plate (base material) of an aluminum alloy "A 390" using an air sprayer, and baked at 200° C. for 60 minutes. Thereby, a sample having a resin layer of a thickness of 25 μm on the plate was obtained.

COMPARATIVE EXAMPLE 6

A sample having a resin layer of a thickness of 25 μm on the plate was obtained in the same manner as in Example 8, except that PTFE powder surface-modified using the metallic sodium complex method, having an average primary particle diameter of 0.1 μm was substituted by PTFE powder the surface of which was not modified, having an average primary particle diameter of 0.1 μm.

The samples prepared in the above Example 8 and Comparative Example 6 were subjected to the following tests using a thrust tester. As FIG. 5(a) shows, a ring-shaped counter piece 51 composed of bearing steel "SUJ 2" was thrust against the resin layer of each sample 50 in the presence of lubricant oil at a load of 9.8 MPa, and the counter piece 51 was rotated at a speed of 1.2 m/s for 100 hours or longer. At the time immediately after starting the test and the time 100 hours after starting the test, the coefficient of friction of each sample 50 was measured. The abrasion loss of each sample at the time 100 hours after starting the test was measured using a surface roughness meter. The results are shown in Table 3.

TABLE 3

| | Coefficient of friction | | |
|---|---|---|---|
| | Initial | After 100 hours | Abrasion loss |
| Ex. 8 | 0.043 | 0.036 | 6.7 μm |
| C. Ex. 6 | 0.046 | 0.041 | 9.5 μm |

As Table 3 shows, the abrasion loss of the sample prepared in Example 8 is less than the sample prepared in Comparative Example 6. This result suggests that wear resistance is improved by the surface modification of fluoro-resin powder in the presence of a lubricant.

The above-described embodiment has the following advantages:

The coating film formed from the paint composition containing surface-modified fluoro-resin powder according to this embodiment has excellent seizure resistance and wear resistance. The coating film also excels in heat resistance, chemical resistance, weather resistance, water and oil repellency, and electrical properties, because the coating film contains a fluoro-resin.

In this embodiment, at least the sliding surfaces of the rotary valve 12, the swash plate 17, and the shoes 20a and 20b are formed of coating films 24 that contain surface-modified fluoro-resin powder, and the coating films 24 have higher seizure resistance and wear resistance than a coating film that contains fluoro-resin powder the surface of which is not modified. Therefore, the rotary valve 12, the swash plate 17, and the shoes 20a and 20b have favorable sliding properties and durability, and operate well in the compressor C. Consequently, the reliability and durability of the compressor C are improved.

In comparison with films that contain a solid lubricant other than fluoro-resin powder together with unmodified fluoro-resin powder, the coating films 24 that contain a solid lubricant other than fluoro-resin powder such as molybdenum disulfide together with surface-modified fluoro-resin powder have improved sliding properties and wear resistance in the presence of lubricant oil.

The average primary particle diameter of fluoro-resin powder contained in the paint composition is preferably 5 μm or less. A fluoro-resin powder having an average primary particle diameter of 5 μm or less is suitable for forming coating films having favorable sliding properties.

It should be apparent to those skilled in the art that the present invention may be embodied in many other specific forms without departing from the spirit of scope of the invention. Particularly, it should be understood that the invention may be embodied in the following forms.

The fluoro-resin is not limited to PTFE, but may be a modified PTFE, tetrafluoroethylene-perfluoroalkylvinyl ether copolymer, tetrafluoroethylene-ethylene copolymer, tetrafluoroethylene-hexafluoropropylene copolymer, tetrafluoroethylene-vinylidene fluoride copolymer, tetrafluoroethylene-hexafluoropropylene-perfluoroalkylvinyl ether copolymer, polychlorotrifluoroethylene, chlorotrifluoroethylene-ethylene copolymer, chlorotrifluoroethylene-vinylidene fluoride copolymer, polyvinylidene fluoride, or polyvinyl fluoride; and preferably PTFE or tetrafluoroethylene-perfluoroalkylvinyl ether copolymer. The paint composition may contain two or more kinds of fluoro-resins.

The solid lubricant other than fluoro-resin powder added to the paint composition together with surface-modified fluoro-resin powder is not limited to molybdenum disulfide, but may be tungsten disulfide, graphite, or boron nitride. The paint composition may contain two or more kinds of solid lubricants.

The ratio of the heat-resistant resin and fluoro-resin powder contained in the paint composition is not limited to the ratio in the above-described embodiment. The ratio of the a weight of fluoro-resin powder contained in the paint composition to the weight of the heat-resistant resin contained in the paint composition is preferably determined so that the ratio of the weight of fluoro-resin powder contained in the coating film formed of the paint composition to the weight of the heat-resistant resin contained in the coating film becomes no less than 1 and no more than 19.

The compounding quantity of the solid lubricant other than fluoro-resin powder is not limited to the compounding quantity in the above-described embodiment.

The paint composition according to this embodiment may further contain additives known in the art contained in commonly used paints, for example, hard particles, such as alumina, silica, silicon carbide, silicon nitride, and iron oxide; sulfur-containing metal compounds, such as ZnS, $Ag_2S$, and CuS; sulfur-containing compounds, such as thiocarbonates and dithiocarbonates; extreme-pressure agents, such as molybdenum dithiophosphate and molybdenum dithiocarbamate; surface-active agents; silane coupling agents; and titanium coupling agents.

The heat-resistant resin contained in the paint composition is not limited to polyamide imide, but may be polyimide, polyamide, phenol, polyphenylene sulfide, epoxy resins, and the modified products of these resins; and is preferably polyamide imide.

The dispersing medium for dispersing fluoro-resin powder may be a dispersing medium containing a thermosetting resin in an uncured state, in place of the heat-resistant resin and the solvent for dissolving the heat-resistant resin.

The details of the conditions for plasma treatment may be changed as required. For example, the proportions of argon and hydrogen in the atmospheric gas used in the plasma treatment, or time for plasma treatment may be changed.

The method for surface modification of fluoro-resin powder is not limited to the plasma treatment and the metallic sodium complex method, but may be a flame treatment or an excimer laser treatment.

Sliding parts other than the swash plate 17, shoes 20a and 20b, and the rotary valve 12, for example, the sliding surfaces of a piston 8 or a lug plate 18, may be formed of coating films 24. The sliding surfaces of a piston 8 include the surfaces sliding between the cylinder block 1 and the front housing 2, and the surfaces sliding between the shoes 20a and 20b. When a sliding bearing is used as the bearing for holding the drive shaft 13 in the compressor C, the sliding surface of the sliding bearing may be formed of a coating film 24.

Not only sliding surfaces, but also the surfaces of sliding parts other than sliding surfaces may also be formed of coating films 24.

The swash plate 17 is not limited to aluminum-based metallic materials such as metallic aluminum and aluminum alloys, but may be formed of iron-based metallic materials or stainless steel.

The present invention may be embodied by a swash-plate type fixed displacement compressor, or may be embodied by a swash-plate type compressor equipped with a double-ended piston. Alternatively, the present invention may be embodied by a swash-plate type compressor equipped with a swash plate that oscillates when the drive shaft rotates, but does not rotate integrally with the drive shaft; or may be embodied by a compressor other than a swash-plate type compressor, such as a scroll-type compressor and a vane-type compressor.

The present invention may be embodied by sliding parts in machines other than compressors, or may be embodied by non-sliding parts. The coating films formed from a paint composition that contains surface-modified fluoro-resin powder contributes to the improvement of heat resistance, chemical resistance, weather resistance, water and oil repellency, and electrical properties in non-sliding parts.

The present examples and embodiments are to be considered as illustrative and not restrictive and the invention is not to be limited to the details given herein, but may be modified within the scope and equivalence of the appended claims.

The invention claimed is:

1. A sliding part comprising a metal base material and a coating film that is formed on the surface of the base material, wherein the film contains a surface-modified fluoro-resin powder and a heat-resistant resin, and the thickness of the film is from 5 to 50 microns.

2. The sliding part according to claim 1, wherein the film further contains a solid lubricant other than said fluoro-resin powder.

3. The sliding part according to claim 2, wherein the solid lubricant is molybdenum disulfide, tungsten disulfide, graphite, or boron nitride.

4. The sliding part according to claim 1, wherein said sliding part is a part of a compressor.

5. The sliding part according to claim 1, wherein said sliding part is a swash plate in a swash plate compressor.

6. The sliding part according to claim 1, wherein said sliding part is a shoe in a compressor.

7. The sliding part according to claim 1, wherein said sliding part is a rotary valve in a piston compressor.

8. The sliding part according to claim 1, wherein said sliding part is a piston in a piston compressor.

9. The sliding part according to claim 1, wherein said heat-resistant resin is polyamide imide.

10. The sliding part according to claim 1, wherein said fluoro-resin powder is polytetrafluoroethylene powder.

11. The sliding part according to claim 1, wherein said fluoro-resin powder has an average primary particle diameter of 5 μm or smaller.

12. The sliding part according to claim 1, wherein the surfaces of said fluoro-resin powder are modified by a plasma treatment method.

13. The sliding part according to claim 1, wherein the surfaces of said fluoro-resin powder are modified by a metallic sodium complex method.

14. The sliding part according to claim 1, wherein the thickness of the film is from 10 to 30 microns.

15. The sliding part according to claim 1, wherein all fluoro-resin powder contained in the film is surface-modified.

16. A sliding part comprising a sliding surface formed of a resin layer containing a surface-modified fluoro-resin powder and a heat-resistant resin, wherein the ratio of the weight of the fluoro-resin powder contained in said resin layer to the weight of the heat-resistant resin contained in said resin layer is no less than 1 and no more than 19.

* * * * *

UNITED STATES PATENT AND TRADEMARK OFFICE
CERTIFICATE OF CORRECTION

| | | |
|---|---|---|
| PATENT NO. | : 7,134,382 B2 | Page 1 of 1 |
| APPLICATION NO. | : 10/828016 | |
| DATED | : November 14, 2006 | |
| INVENTOR(S) | : Hitotoshi Murase et al. | |

It is certified that error appears in the above-identified patent and that said Letters Patent is hereby corrected as shown below:

In the Specification

At column 3, line 24, please delete "compressor As" and insert therefor --compressor. As--; and At column 5, line 11, please delete "coolant gat" and insert therefor --coolant gas--.

Signed and Sealed this

Fourth Day of September, 2007

JON W. DUDAS
*Director of the United States Patent and Trademark Office*